(12) United States Patent
Kohler et al.

(10) Patent No.: US 6,244,109 B1
(45) Date of Patent: Jun. 12, 2001

(54) DEVICE AND METHOD FOR MONITORING AN ACCELERATION SENSOR LOCATED IN A VEHICLE

(75) Inventors: Rolf Kohler, Schwieberdingen; Johannes Schmitt, Markgroeningen; Guenter Braun, Bietigheim; Andreas Zeobele, Markgroeningen; Matthias Kottmann, Wendlingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/410,278

(22) Filed: Sep. 30, 1999

(30) Foreign Application Priority Data

Sep. 30, 1998 (DE) ................................................ 198 44 880

(51) Int. Cl.$^7$ ................................ G01P 15/00; B60T 8/32
(52) U.S. Cl. .................... 73/488; 701/70; 303/121
(58) Field of Search .................... 73/488; 701/70, 701/71; 303/121, 122, 122.01, 122.02, 122.03, 122.06, 122.08, 138, 139, 140

(56) References Cited

U.S. PATENT DOCUMENTS 5,774,821 * 6/1998 Eckert ..................................... 701/78

FOREIGN PATENT DOCUMENTS

| 39 30 302 | 5/1990 | (DE) . |
| 195 34 760 | 3/1996 | (DE) . |
| 196 36 443 | 3/1998 | (DE) . |
| 6-258343 | 9/1994 | (JP) . |
| 0 931 8660 | 12/1997 | (JP) . |

* cited by examiner

Primary Examiner—Richard A. Moller
(74) Attorney, Agent, or Firm—Kenyon & Kenyon

(57) ABSTRACT

A device for monitoring an acceleration sensor located in a vehicle and detecting an acceleration quantity that describes an acceleration acting upon the vehicle. The device includes an averaging device that is used to generate a mean value of the acceleration quantity for a definable period of time. The mean value is largely independent of driving maneuvers performed with the vehicle. The device also includes a monitoring device in which a comparison between the mean value of the acceleration quantity and a threshold value is carried out to monitor the acceleration sensor.

15 Claims, 2 Drawing Sheets

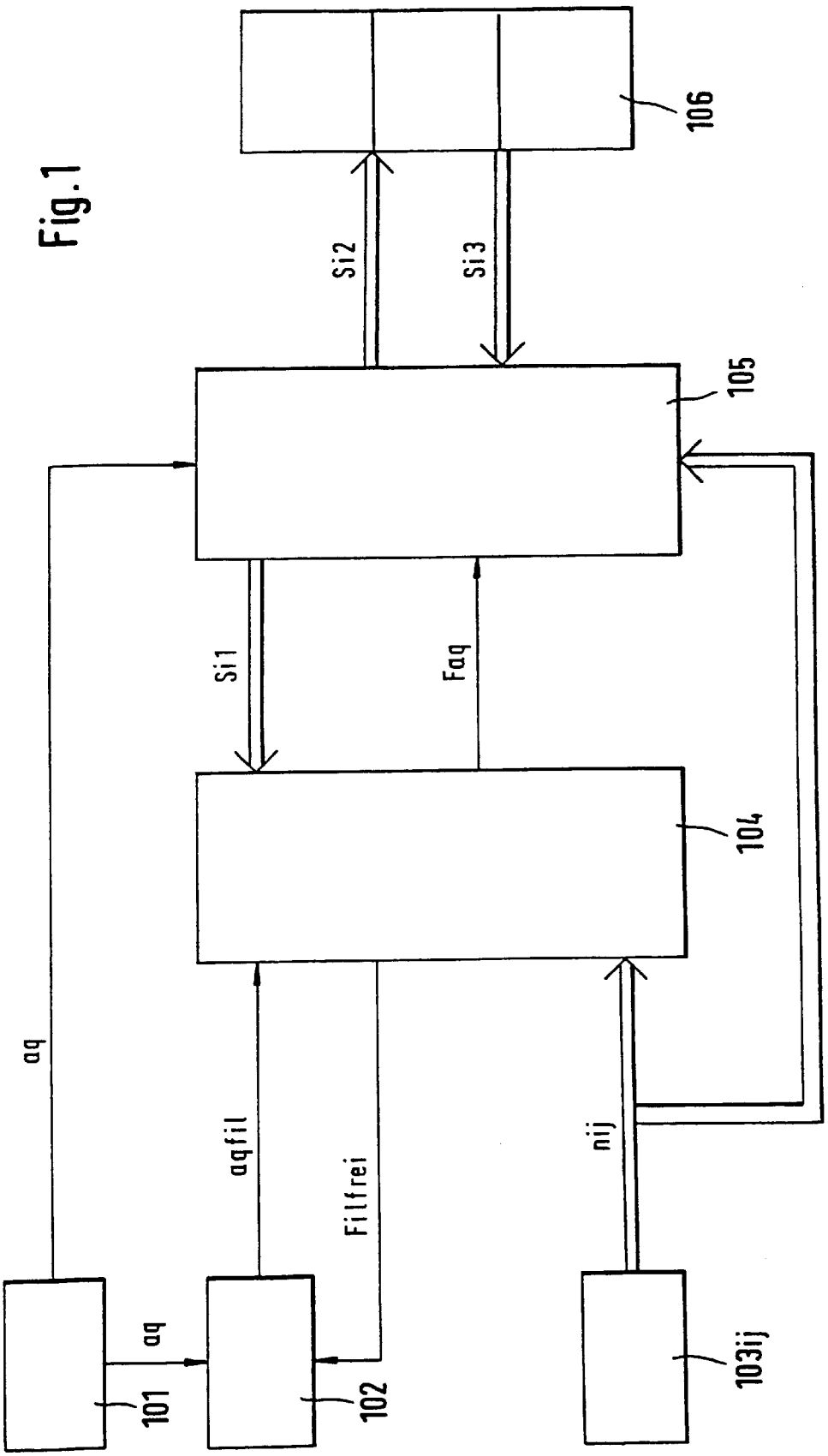

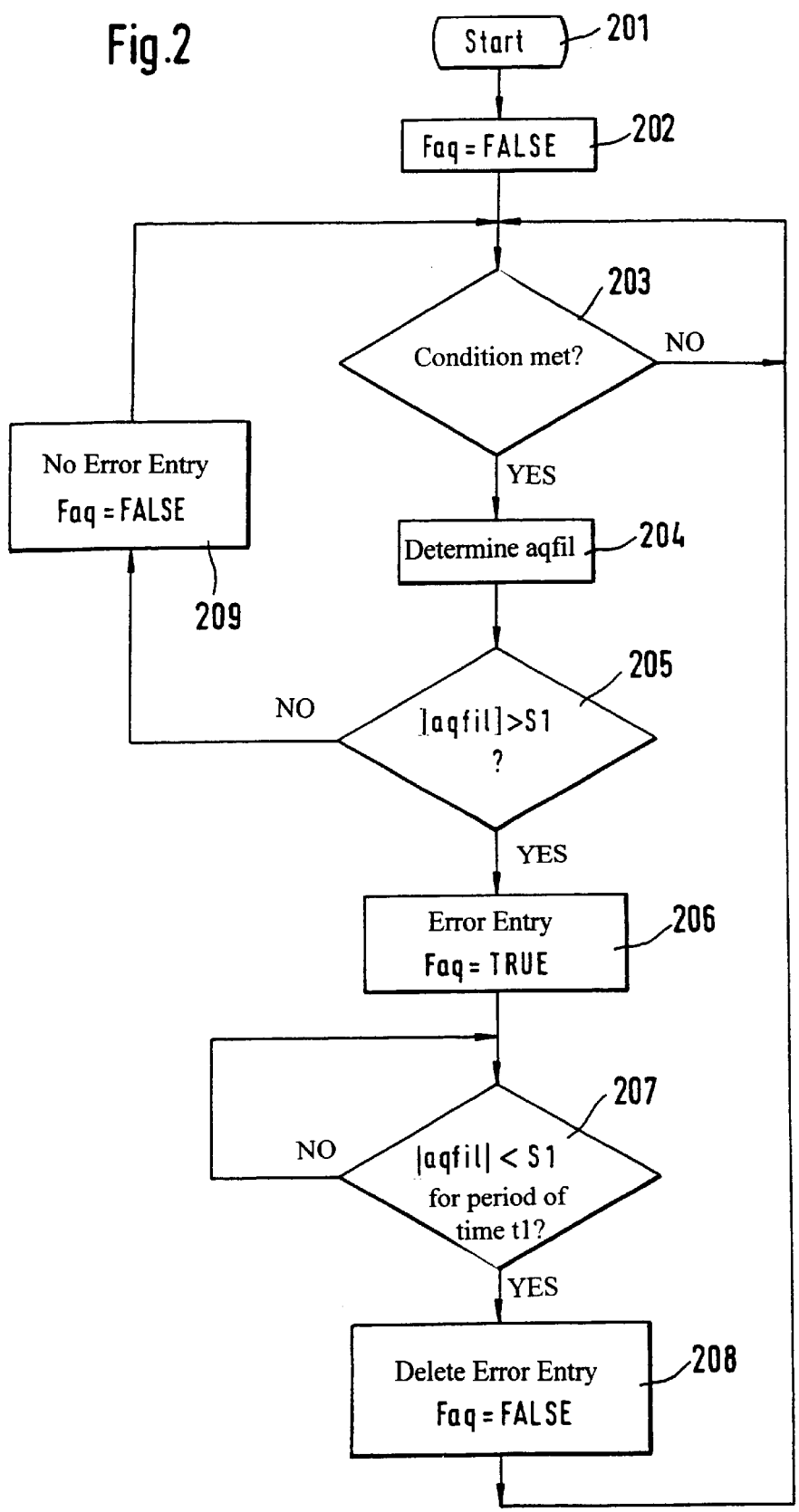

DEVICE AND METHOD FOR MONITORING AN ACCELERATION SENSOR LOCATED IN A VEHICLE

FIELD OF THE INVENTION

The present invention relates to a device and a method for monitoring an acceleration sensor located in a vehicle.

BACKGROUND INFORMATION

A control device with an acceleration sensor and an error control unit for motor vehicles is described in German Patent No. 39 30 302. This control device includes a first acceleration sensor for detecting longitudinal accelerations and a second acceleration sensor, for example, for detecting transverse accelerations. The control device also includes a facility for recording the signals from the acceleration sensors and for deriving a data value on the basis of the two signals. The data value is compared to a preset comparison value in a further facility and an error in one of the sensor signals is detected. The data value is derived, for example, by adding up the acceleration signals or determined as the root of the sum of the squares of the acceleration signals.

With this monitoring method, the signals of both acceleration sensors are always used directly for sensor monitoring. This means, first of all, that an acceleration sensor cannot be monitored only on the basis of its own signal. In addition, there is no indication of how to prepare the acceleration quantity prior to monitoring so that it will be largely independent of driving maneuvers performed with the vehicle. In other words, it is not possible to monitor the sensor independently of vehicle movement.

SUMMARY OF THE INVENTION

The object of the present invention is to provide a device and a method for monitoring an acceleration sensor located in a vehicle, with the device and method being used to monitor an acceleration sensor only on the basis of its own signal. Furthermore, it should be possible to monitor the acceleration sensor independently of driving maneuvers performed with the vehicle.

The device according to the present invention is used to monitor an acceleration sensor that is located in a vehicle and detects an acceleration quantity that describes an acceleration acting upon the vehicle. In particular, the acceleration sensor is a transverse acceleration sensor used to detect a transverse acceleration quantity that describes the transverse acceleration acting upon the vehicle.

To make acceleration sensor monitoring independent of driving maneuvers performed with the vehicle, and to make them largely independent of vehicle movement, the device advantageously includes averaging means used to generate a mean value of the acceleration quantity for a definable period of time. This mean value is largely independent of driving maneuvers performed with the vehicle. The averaging means are advantageously designed in the form of a low-pass filter. In particular, the low-pass filter has a high filter constant that is selected so that the mean value is largely independent of driving maneuvers performed with the vehicle. This makes it possible to monitor the acceleration sensor independently of vehicle movement, which means that the components of the acceleration quantity that are caused by vehicle movement or by vehicle maneuvers are filtered out by the averaging means. It is thus possible, for example, to determine whether the acceleration quantity, and therefore the acceleration sensor signal, has drifted out of its zero position, whether the acceleration sensor is properly seated in its mounting position, or whether the acceleration sensor is aging.

At this point what it means to monitor the acceleration sensor independently of driving maneuvers performed with the vehicle and make the mean value largely independent of driving maneuvers performed with the vehicle is examined. Each driving maneuver performed with the vehicle produces a change in the signal or acceleration quantity detected by the acceleration sensor. By generating a mean value of the acceleration quantity, the components of the acceleration quantity that are based on the driving maneuver are averaged. In other words, the mean value indicates the value of the acceleration quantity that would be obtained when driving the vehicle in a straight line. The value of the acceleration quantity when driving in a straight line is normally zero. If it is not zero, however, this means that a sensor malfunction has occurred (the sensor has aged or is not properly seated in its mounting position). During vehicle movement in any type of driving maneuver, the device according to the present invention can evaluate the mean value, thereby determining a malfunction in the acceleration sensor that would otherwise be detected only when driving in a straight line.

It is also advantageous to limit the increase in the acceleration quantity before the latter is supplied to the low-pass filter. One purpose of this is that it suppresses any jitter that may be present in the acceleration quantity. In addition, it also suppresses disturbances caused by a possible rocking contact. By limiting the increase, it is possible to determine that the acceleration quantity supplied to the averaging means, in this case the low-pass filter, was already filtered in advance.

The device contains monitoring means for monitoring the sensor. A comparison between the mean value of the acceleration quantity and a threshold value is carried out in these monitoring means. This comparison advantageously determines whether the amount of the mean value of the acceleration quantity is greater than the threshold value. A determination is made as to whether the acceleration sensor is defective based on this comparison. The acceleration sensor is defective if the amount of the mean value of the acceleration quantity is greater than the threshold value. The acceleration sensor is not defective if the amount of the mean value of the acceleration quantity is less than the threshold value.

A pointer quantity is advantageously used to indicate whether the acceleration sensor is defective. In the event that the acceleration sensor is defective, the pointer quantity is assigned a first value characterizing this fact. In the event that the acceleration sensor is not defective, the pointer quantity is assigned a second value characterizing this fact. On the basis of the monitoring means, this pointer quantity is used to notify, for example, a controller, that the acceleration sensor is defective.

Averaging makes it possible to filter out the components of the acceleration quantity caused by driving maneuvers from the acceleration quantity corresponding to the signal generated by the acceleration sensor. This means that the acceleration sensor can be monitored independently of vehicle movement. Variations in the acceleration quantity that are caused, for example, by turning the vehicle are therefore ignored when monitoring the acceleration sensor. This makes it possible, for example, to determine that the acceleration quantity has drifted from its zero position, the acceleration sensor is not properly seated in its mounting position, or the acceleration quantity has varied due to the acceleration sensor aging process.

Averaging makes it possible, for example, to eliminate changes in the acceleration quantity caused by steering movements. In other words, the effect of averaging is that the vehicle seems to be always driving in a straight line, at least based on the mean value, i.e., the filtered acceleration quantity. If the acceleration quantity, for example, drifts out if its zero position, the acceleration quantity continuously assumes a value other than zero, which is reflected by the mean value of the acceleration quantity. Consequently, a comparison between the mean value and a threshold value makes it possible to detect a malfunction in the acceleration sensor that was caused by drifting from the zero position or improper seating in the mounting position.

With the device according to the present invention, the error entry made in the pointer quantity can be advantageously reversed. This is accomplished by checking the condition of whether the amount of the mean value of the acceleration quantity has dropped back below the threshold value for a definable period of time after it has been determined that the acceleration sensor is defective. After it has been determined that the amount of the mean value of the acceleration quantity has dropped back below the threshold value for a definable period of time, the acceleration sensor is regarded as no longer defective, and the pointer quantity is assigned the second value.

It is advantageous to monitor the acceleration sensor only if at least one condition has been met. The purpose of this is to avoid vehicle operating states that could corrupt the monitoring result. Monitoring is carried out if a quantity describing the vehicle speed exceeds a threshold value; and/or if no braking action has occurred; and/or if an anti-skid system provided in the vehicle, in particular an anti-skid braking system, is inactive. The condition of whether a difference quantity derived from wheel rotational speed quantities is less than a threshold value is also checked. This difference quantity describes the deviation between the maximum wheel rotational speed quantity and the minimum wheel rotational speed quantity.

BRIEF DESCRIPTION OF THE DRAWINGS

FIG. 1 shows an overview arrangement of a device according to the present invention for implementing a method according to the present invention.

FIG. 2 shows a flowchart illustrating an embodiment for implementing a method according to the present invention.

DETAILED DESCRIPTION

The present invention is first described on the basis of FIG. 1.

Block 101 represents an acceleration sensor used to detect an acceleration quantity that describes an acceleration acting upon the vehicle. In the present embodiment, the acceleration sensor is a transverse acceleration sensor used to detect a transverse acceleration quantity aq. Transverse acceleration quantity aq is supplied to a block 102 and a block 105, which is described below.

Block 102 represents averaging means used to generate a mean value aqfil of the acceleration quantity or, in the present case, of transverse acceleration quantity aq, for a definable period of time. Mean value aqfil is supplied from block 102 to a block 104. Block 104 represents monitoring means in which a comparison between the mean value of the transverse acceleration quantity and a threshold value is carried out to monitor the transverse acceleration sensor. The result of this comparison is supplied from block 104 to block 105, using a pointer quantity Faq.

In addition to performing the comparison for monitoring the transverse acceleration sensor, block 104 also checks whether various conditions have been met. The transverse acceleration sensor is monitored only if these conditions have been met. In the present embodiment, this is achieved as follows: if block 104 determines that the conditions have been met, quantity Filfrei is sent from block 104 to averaging means 102. This notification activates averaging means 102, i.e., transverse acceleration quantity aq can be inputted, thus generating mean value aqfil needed for the comparison. If the conditions have not been met, averaging means 102 are not activated, i.e., transverse acceleration quantity aq is not inputted, which means that mean value aqfil cannot be generated. Consequently, the comparison needed to monitor the transverse acceleration sensor cannot be carried out.

To check whether the conditions have been met, various quantities or signals are sent to monitoring means 104. These quantities include wheel rotational speed quantities nij describing the rotational speeds of the wheels and are detected by detecting means 103$ij$.

According to the reference notation used, the two indices have the following meanings: index i indicates whether the wheel is a wheel attached to the front axle (v) or a wheel attached to the rear axle (h). Index j indicates whether it is a right (r) wheel or a left (l) wheel.

In addition, the quantities are signals or quantities Si1, which are supplied from block 105 to monitoring means 104. Quantities or signals Si1 represent, for example, a quantity vf describing the vehicle speed; or a quantity indicating whether a braking action has occurred; or a quantity indicating whether an anti-skid system provided in the vehicle, in particular an anti-skid braking system, is active. The conditions have been met if the quantity describing the vehicle speed exceeds a threshold value; and/or no braking action has occurred; and/or the anti-skid system provided in the vehicle is inactive. The condition of whether a difference quantity describing the deviation between the maximum wheel rotational speed quantity and the minimum wheel rotational speed quantity is less than a threshold value is checked on the basis of wheel rotational speed quantities nij. As mentioned above, a notification in the form of quantity Filfrei is sent to averaging means 102 when the conditions have been met.

Block 105 represents a controller. This controller includes a control unit or regulator that is used to influence the transverse dynamics of the vehicle. Wheel rotational speed quantities nij and transverse acceleration quantity aq are supplied to controller 105 to detect the vehicle situation.

To influence the transverse dynamics of the vehicle, controller 105 emits signals or quantities Si2 which are supplied to a block 106 representing the actuators located in the vehicle. These are actuators used to influence the engine or the engine torque produced by the engine. Depending on whether the engine is a spark-ignition or a Diesel engine, this can be done by influencing the throttle angle, ignition point (ignition angle), amount of fuel supplied, or charging pressure. In addition, it is possible to manipulate the coupling used to transmit force between the engine and driving wheels or to manipulate the gear train. One conceivable way to manipulate the gear train, for example, is to switch to a higher gear, thus reducing the driving torque. Manipulation of the vehicle brakes is also conceivable. Influencing the driving torque can limit, reduce, or increase the driving torque. The manipulations described above influence vehicle stability within a limit range, thus supporting the driver in critical driving situations. This increases vehicle steerability during forward motion, and the vehicle is therefore less likely to be understeered.

Quantities or signals Si3, which indicate the status of the various actuators and are used for regulation or control purposes, are supplied to controller 105 from actuators 106.

FIG. 2, which shows the sequences of steps in the method according to the present invention on the basis of a flowchart, is described below. The method according to the present invention begins with a step 201. This is followed by a step 202, in which pointer quantity Faq is initialized. For this purpose, value FALSE is assigned to pointer quantity Faq. Step 202 is followed by a step 203. This step checks where the conditions have been met. If the conditions have not been met, step 203 is repeated. Reference should be made at this point to quantity Filfrei illustrated in FIG. 1, which is used to communicate this fact to averaging means 102. If, on the other hand, the conditions have been met, step 203 is followed by a step 204. Step 204 is used to determine mean value aqfil of transverse acceleration quantity aq for a definable period of time. As mentioned above, this is preferably accomplished by using a low-pass filter. For example, the following equation:

$$Y(K)=Y(K-1)+(X(K)-Y(K-1))\cdot \beta,$$

where $\beta=1-E\Xi\Pi(-T_0/T)$, $K=\tau i \mu \epsilon$ represents the filter equation for the low-pass filter. The quantities included in the above filter equation have the following meanings:

X(K) is the low-pass input quantity (transverse acceleration quantity aq) at time K.

Y(K) and Y(K−1) represent the mean value (aqfil), i.e., the filtered low-pass signal at times K and K−1.

T represents the filter constant, which in the present case is selected so that mean value aqfil is largely independent of driving maneuvers performed with the vehicle.

$T_0$ represents the intervals at which the individual input quantity values are read into the low-pass filter.

Step 204 is followed by a step 205. Step 205 is used to determine whether the amount of mean value aqfil is greater than a threshold value S1. If the amount of mean value aqfil is greater than threshold value S1, which means that transverse acceleration sensor 101 is defective, an error entry must be made, and step 205 is followed by a step 206 in which pointer quantity Faq is assigned value TRUE.

If, however, step 205 determines that the amount of mean value aqfil is less than threshold value S1, which means that transverse acceleration sensor 101 is not defective—and an error entry does not have to be made—step 205 is followed by a step 209, in which pointer quantity Faq is assigned value FALSE. Step 203 is then repeated following step 209.

After step 205 has determined that the transverse acceleration sensor is defective, and step 206 has assigned value TRUE to pointer quantity Faq, step 207, which follows step 206, checks the condition of whether the amount of mean value aqfil has dropped back below threshold value S1 for a preset period of time T1. The purpose of the query performed in step 207 is to allow the error entry to be reversed if the transverse acceleration sensor is determined to be no longer defective for period of time T1.

If step 207 determines that the amount of mean value aqfil is less than threshold value S1 for period of time T1, which means that the transverse acceleration sensor is no longer defective, step 207 is followed by a step 208, which deletes the error entry by assigning value FALSE to pointer quantity Faq. Step 203 is then repeated following step 208.

If, however, step 207 determines that the above condition has not been met, step 207 is repeated.

The steps of the method shown in FIG. 2 take place in blocks 102 and 104 illustrated in FIG. 1.

At this point, note that, if the transverse acceleration sensor is defective, a transverse acceleration derived from the rotational speeds of the non-driven wheels can be used instead of the transverse acceleration quantity detected by the transverse acceleration sensor.

In conclusion, note that the specific embodiment selected in the description and the representation selected in the figures are in no way intended to limit the main idea of the present invention. For example, the device according to the present invention and the method according to the present invention can also be used for acceleration sensors that detect a longitudinal acceleration or an acceleration in the vertical direction of the vehicle.

What is claimed is:

1. A device for monitoring an acceleration sensor in a vehicle which detects an acceleration quantity describing an acceleration acting upon the vehicle, the device comprising:

an averaging device generating a mean value of the acceleration quantity for a defined time period, the mean value being substantially independent of driving maneuvers performed with the vehicle; and a monitoring device monitoring the acceleration sensor by performing a comparison between the mean value of the acceleration quantity and a first threshold value.

2. The device according to claim 1, wherein the acceleration sensor is a transverse acceleration sensor, the transverse acceleration sensor detecting a transverse acceleration quantity, the transverse acceleration quantity describing a transverse acceleration acting upon the vehicle.

3. The device according to claim 1, wherein the averaging device includes a low-pass filter, the low-pass filter having a high filter constant, the high filter constant being selected so that the mean value is substantially independent of the driving maneuvers performed with the vehicle.

4. The device according to claim 1, wherein the acceleration sensor is monitored only if at least one condition exists.

5. The device according to claim 4, wherein the at least one condition includes at least one of:

a quantity describing vehicle speed exceeds said first threshold value;

a braking action has not occurred; and an anti-skid system is inactive.

6. The device according to claim 4, further comprising:

a detecting device detecting wheel rotational speed quantities and determining as a condition whether a difference quantity derived from the wheel rotational speed quantities is less than said first threshold value, the wheel rotational speed quantities describing at least one rotational speed of at least one wheel.

7. The device according to claim 6, wherein the difference quantity describes a deviation between a maximum wheel rotational speed quantity and a minimum wheel rotational speed quantity.

8. The device according to claim 1, wherein the comparison is used to determine whether an absolute value of the mean value is greater than the first threshold value and whether the acceleration sensor is defective.

9. The device according to claim 8, wherein the acceleration sensor is defective when the absolute value of the mean value is greater than the first threshold value, and the acceleration sensor is not defective when the absolute value of the mean value is less than the first threshold value.

10. The device according to claim 8, wherein whether the absolute value of the mean value has dropped below the first threshold value for a defined time period is determined after the acceleration sensor has been determined to be defective.

11. The device according to claim 8, wherein a pointer quantity indicates whether the acceleration sensor is defective, the pointer quantity being assigned a first value when the acceleration sensor is defective, the pointer quantity being assigned a second value when the acceleration sensor is not defective.

12. The device according to claim 11, wherein the pointer quantity is assigned the second value after the absolute value of the mean value drops below the first threshold value for a defined time period indicating that the acceleration sensor is no longer defective.

13. The device according to claim 3, wherein an increase in the acceleration quantity is limited before the acceleration quantity is supplied to the low-pass filter.

14. A method for monitoring an acceleration sensor located in a vehicle, comprising the steps of:

detecting an acceleration quantity using the acceleration sensor, the acceleration quantity describing an acceleration acting upon the vehicle;

generating a mean value of the acceleration quantity for a defined time period; and monitoring the acceleration sensor by performing a comparison between the mean value and a first threshold value.

15. The method according to claim 14, wherein the acceleration sensor is a transverse acceleration sensor, the transverse acceleration sensor detecting a transverse acceleration quantity, the transverse acceleration quantity describing a transverse acceleration acting upon the vehicle.

* * * * *